United States Patent [19]

Cataldo

[11] Patent Number: 4,729,757

[45] Date of Patent: Mar. 8, 1988

[54] LINK ELEMENTS FOR FORMING A V-BELT

[75] Inventor: Roy S. Cataldo, Birmingham, Mich.

[73] Assignee: General Motors Corporation, Detroit, Mich.

[21] Appl. No.: 48,557

[22] Filed: May 11, 1987

[51] Int. Cl.⁴ .............................................. F16G 5/18
[52] U.S. Cl. .................................... 474/242; 474/201
[58] Field of Search ............... 474/201, 242, 212, 272; 59/84, 85, 88, 89

[56] References Cited

U.S. PATENT DOCUMENTS

| | | | |
|---|---|---|---|
| 1,120,961 | 12/1914 | Morse | 474/212 |
| 1,911,184 | 5/1933 | Flynn | 474/242 X |
| 4,473,365 | 9/1984 | Lapeyre | 474/242 X |

Primary Examiner—Stephen J. Novosad
Assistant Examiner—Thuy M. Bui
Attorney, Agent, or Firm—Donald F. Scherer

[57] ABSTRACT

A V-belt (11) formed from a successive series of novel link elements (10). Each link element (10) has a body portion (20) which presents laterally spaced, beveled side wall (21 and 22). The body portion (20) includes first and second plate-like portions (28 and 29). Each plate-like portion (28 and 29) has first and second end surfaces (30,31 and 32,33, respectively). The second plate-like portion (29) overlies the first plate-like portion (28) and is longitudinally disposed with respect thereto such that the first end surface (32) of the second plate-like portion (29) is disposed in general proximity to the second end surface (31) of the first plate-like portion (28). A hook (35) extends vertically upwardly from the first plate-like portion (28) in proximity to the first end surface (30) thereof. An aperture (46) penetrates the second plate-like portion (29) to define a draw bar (48) in proximity to the second end surface (33) of the second plate-like portion (29). The hook (35) is selectively receivable within the aperture (46) such that an interlocking arrangement is effected between a concave recess (45) in the hook (35) and a protuberance (50) on the draw bar (48) in order to maintain the successive link elements (10) selectively joined.

3 Claims, 8 Drawing Figures

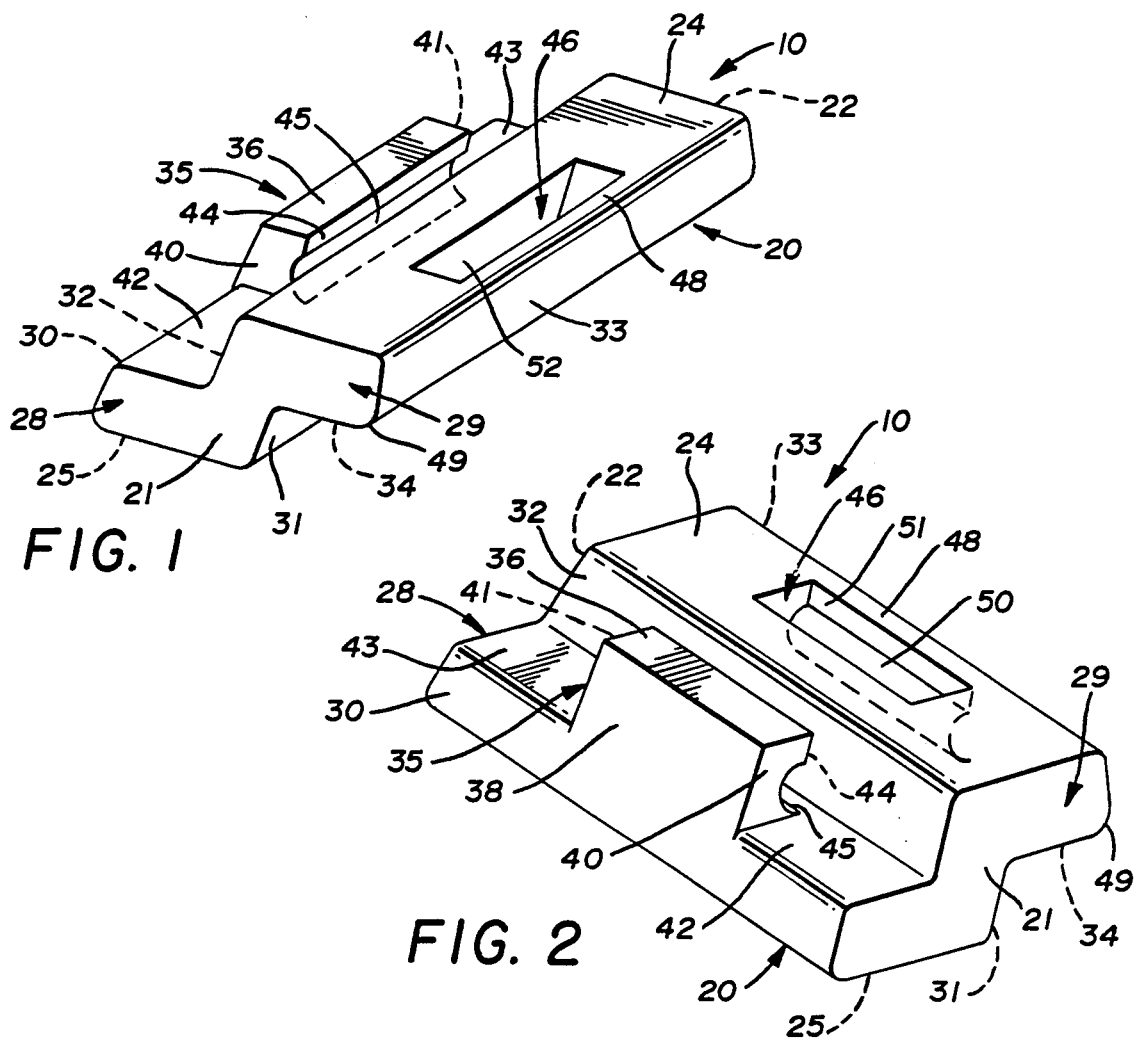
FIG. 1
FIG. 2
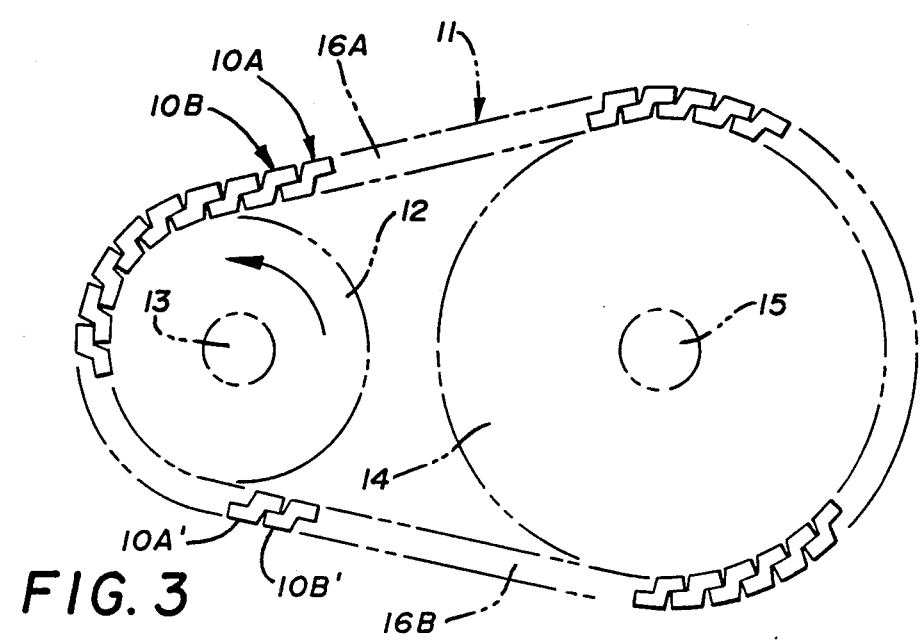
FIG. 3

LINK ELEMENTS FOR FORMING A V-BELT

TECHNICAL FIELD

The present invention relates generally to systems by which rotational power can be transmitted, or transferred, from one place to another. More particularly, the present invention relates to a transmission system in the nature of a V-belt by which rotational power can be transferred from the sheave on a drive shaft to the sheave on a driven shaft. Specifically, the present invention relates to novel link elements that can be selectively interconnected in a successive series to form a V-belt that is capable of transmitting rotational power to a sheave on the driven shaft by having the sheave on the drive shaft apply a load that results in either a tensile or a compressive stress within the V-belt.

BACKGROUND OF THE INVENTION

Rudimentary forms of endless, flexible devices to transmit rotational power, or torque, between two shafts have been employed for centuries. For example, a form of "chain" drive comprising wooden struts held in the desired position by cable, or line, much like a rope ladder, was used more than 3000 years ago. The rope ladder configuration was supplanted by metallic chains during medieval times, but it was not until the nineteenth century that vast technical strides were made in the development of efficient, flexible power transmission systems.

One avenue of that development provided considerable advances toward perfection of the currently well known chain drives.

Another avenue of that development lead to the current state of the art relating to belt drives, and the present invention constitutes a novel and unique improvement to the belt drive art. In a belt drive the power is transmitted between the drive and driven shafts by the frictional engagement between the pulleys, one on the drive shaft and one on the driven shaft, and the endless, flexible belt. In time, the historically employed flat belt was replaced, for many applications, by the far more efficient, and reliable, V-belt.

A wide variety of materials were employed in the manufacture of belt drives. Initially, leather was one of the prime materials from which the belts were fabricated. Cotton webbing has also been extensively used to make belts, as has rubber and even flexible steel bands. Even in this current age of high technology a combination of fabric and vulcanized rubber comprises a highly popular construction for V-belts. However, that construction will not suit all installations.

Many considerations are taken into account when selecting the material to be used in the manufacture of V-belts, not the least of which are the environmental conditions to which the V-belt will be subjected. Other considerations are the magnitude of the power to be transmitted as well as the rotational speed of the shafts and the resulting linear speed to which the V-belt will be subjected.

By and large V-belts have historically been fabricated as single units that are intended to transmit power under the application of forces that induce a tensile stress in the V-belt. However, the manufacture of V-belts as a single unit has at least one serious limitation inasmuch as a single, localized defect, occurring either as a result of some flaw introduced during the manufacturing process or as a result of wear occasioned by usage, requires the replacement of the entire V-belt. As such, it is recognized that V-belts can be more efficiently fabricated from a plurality of individual elements, or links. Thus, if one link in a V-belt should be defective, or otherwise require replacement, replacement can be effected without the necessity of replacing the entire V-belt.

A common approach has been to fabricate the individual links with a T-shaped connector at one end thereof and with a notch, or slot, at the other end that has a configuration specifically adapted to receive the T-shaped connector presented from an identically shaped, successively located link. While this specific approach cures the major defects experienced with one piece V-belts, it subjects the user to its own unique problems. The chief disadvantage is that when such links are assembled in an endless belt they tend to become disengaged from one another at inopportune times, thus resulting in considerable inconvenience to the user. As might be expected, this disadvantage has spawned a variety of improvements targeted to obviate that difficulty.

Another disadvantage of the prior known link arrangements resides in the fact that the configuration of the notch, or slot, tends to reduce the transverse columnar strength of each link, thus subjecting the interconnection between successive links to potential binding as a result of the transverse loading applied against the conjoined links as a result of their engagement with the sheaves on the drive, and driven, shafts, respectively. The very fact that the T-shaped connectors are disposed longitudinally beyond the body portion of the prior known link constructions in order to facilitate their engagement with the notch, or slot, on the successive link precludes the T-shaped connector from enhancing the transverse columnar strength of the prior known link arrangement.

A further disadvantage attendant upon having the T-shaped connector extend longitudinally beyond the body portion of the link is that the joinder between the T-shaped connector and the body portion of the link is virtually non resistant to the application of torsional forces between successive links.

Perhaps the most representative configuration for links employed to form V-belts adapted to transmit power by loads resulting in tensile stress within the V-belt is disclosed in U.S. Pat. No. 4,473,365.

It should also be appreciated that whereas the various and sundry readily replaceable link arrangements utilized to form V-belts effect power transference when the V-belt is under tensile stress, certain well known V-belt arrangements exist that are uniquely suited to the transmission of power by the application of forces resulting in compressive stresses within the V-belt. Such arrangements employ one or more flexible, metal bands, or strips, which extend along the path defined by the belt and which support a plurality of compressive members that are disposed along the complete length of the bands.

Perhaps the most representative configurations for this style of belt are disclosed in two U.S. Pat. Nos. 3,720,113 and 4,080,841.

SUMMARY OF THE INVENTION

It is, therefore, a primary object of the present invention to provide a novel and unique link element that can be selectively conjoined in a successive series to form a V-belt that is equally suited to transfer power under the application of a tensile stress to the V-belt as it is to the application of a compressive stress.

It is another object of the present invention to provide a link element, as above, that incorporates a novel and unique interlocking means which assures that successive link elements can only be joined, or separated, in response to the predetermined manipulative movement of one link element with respect to the other.

It is a further object of the present invention to provide a link element, as above, which incorporates uninterrupted transverse columnar integrity at both longitudinal ends as well as at the middle thereof.

It is yet another object of the present invention to provide a link element, as above, the configuration of which provides the optimal resistance to torsional stresses.

It is a still further object of the present invention to provide a link element, as above, the configuration of which provides the optimal resistance to bending stresses.

These and other objects of the invention, as well as the advantages thereof over existing and prior art forms, which will be apparent in view of the following detailed specification, are accomplished by means hereinafter described and claimed.

In general, the unique link elements embodying the concepts of the present invention can be conjoined in a successive series to form a V-belt. The link elements are definable in relation to a three-axis frame of reference—namely: a longitudinal, a lateral and a vertical axis. Each link element has a body portion, and the body portion has laterally spaced, beveled side walls. Between the side walls the body portion includes first and second plate-like portions.

Each plate-like portion has longitudinally spaced, first and second ends. The second plate-like portion vertically overlies the first plate-like portion and is longitudinally disposed with respect to the first plate-like portion such that the first end of the second plate-like portion is disposed in general proximity to the second end of the first plate-like portion.

Hook means extend vertically upwardly from the first plate-like portion in proximity to the first end thereof. An aperture penetrates the second plate-like portion to define a draw bar at the second end of the second plate-like portion. The hook means on one link element is insertably receivable through the aperture in a successively disposed link element to engage the draw bar and effect an operative connection between those link elements. This operative connection is repeated through the entire succession of link elements forming the V-belt.

An interlocking arrangement selectively maintains the aforesaid operative connection between the draw bar and the hook means.

An exemplary link element embodying the concepts of the present invention is shown by way of example in the accompanying drawings and described in detail without attempting to show all of the various forms and modifications in which the invention might be embodied; the invention being measured by the appended claims and not by the details of the specification.

BRIEF DESCRIPTION OF THE DRAWINGS

FIG. 1 is a perspective view of a link element embodying the concepts of the present invention;

FIG. 2 is also a perspective view of the link element depicted in FIG. 1, but representing the link element as though it had been rotated clockwise approximately 90 degrees about a vertical axis;

FIG. 3 is a schematic, side elevational view of an exemplary V-belt formed from a successive series of link elements of the type depicted in FIGS. 1 and 2 and connected between sheaves mounted, respectively, on a drive and a driven shaft;

DESCRIPTION OF AN EXAMPLARY EMBODIMENT

Figure 4:
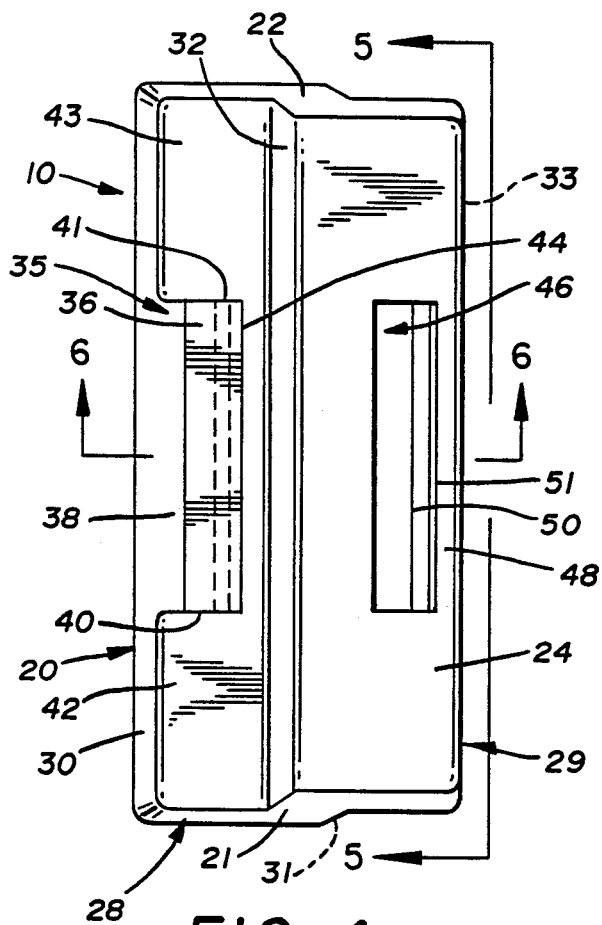
FIG. 4 is top plan view of the link element depicted in FIGS. 1 and 2.

An exemplary link element embodying the concepts of the present invention is designated generally by the numeral 10 on the attached drawings. A successive series of such link elements 10 may be operatively joined to form a V-belt 11 that is depicted in FIG. 3 as being operatively connected between a sheave 12 on a drive shaft 13 and a sheave 14 on a driven shaft 15.

Because a V-belt 11 constitutes an endless band comprised of a plurality of individual link elements 10 it is deemed to be confusing to attempt to describe the link element with respect to the customary "top," "bottom," "right" or "left" directional references inasmuch as the application of those terms not only to a link element 10 but also to the V-belt 11 in which a plurality of such link elements 10 are incorporated would not be consistent and, in fact, could be confusing. A moments reflection will reveal that the use of those terms to describe run 16A of the V-belt 11 will not be applicable to describe run 16B of the same V-belt 11 let alone to the individual link elements in said runs.

Accordingly, the description of the individual link elements 10 is deemed to be facilitated by employing a three-axis frame of reference that is arbitrarily selected in that it conforms to the orientation of the representative link element 10 depicted in detail by virtue of the various figures of the drawings attached hereto. For the reasons previously explained, however, even the selected, three axis frame of reference may not always be applicable with respect to the different runs 16A and 16B of a V-belt 11 in which the link elements 10 are employed.

Figure 5:
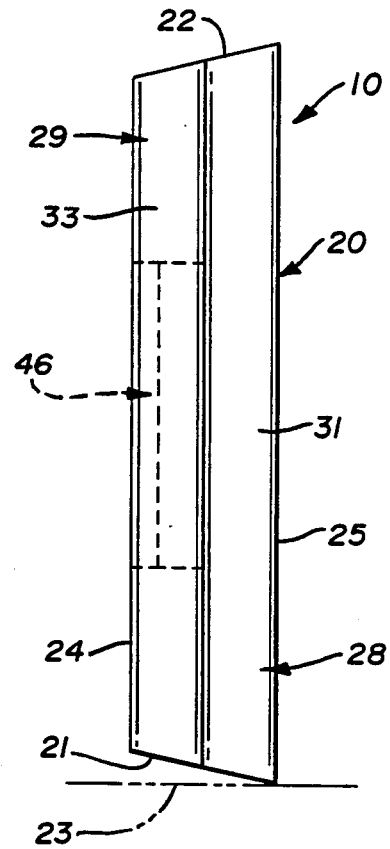
FIG. 5 is an end elevational view taken substantially along line 5—5 of FIG. 4.

With the foregoing preamble it will be observed that the body portion 20 of an exemplary link element 10 has laterally spaced side walls 21 and 22. As best seen in FIG. 5 the side walls 21 and 22 are beveled at the customary angle employed operatively to engage the correspondingly beveled sheaves, such as the sheaves 12 and 14, which are to be engaged by the link elements 10 when incorporated in a V-belt 11. Typically, the side walls 21 and 22 would, therefore, be beveled at approximately 11 degrees with respect to a vertical frame of reference 23. Between the beveled side walls 21 and 22 the vertically uppermost surface 24 of the body portion 20 will be disposed on the inside of the V-belt 11 and the vertically lowermost surface 25 of the body portion 20 will be disposed on the outside of the V-belt 11.

Within the lateral and vertical bounds defined by the side walls 21 and 22 and the uppermost and lowermost surfaces 24 and 25, respectively, the body portion 20 of the link element 10 may be conveniently described as having first and second plate-like portions 28 and 29, respectively. The first plate-like portion 28 has longitudinally spaced, first and second ends defined by the end surfaces 30 and 31, respectively, and the second plate-like portion 29 similarly has longitudinally spaced, first and second ends, defined by end surfaces 32 and 33, respectively.

The second plate-like portion 29 not only contiguously overlies the first plate-like portion 28 but is also longitudinally disposed with respect to the first plate-like portion 28 such that the first end surface 32 of the second plate-like portion 29 is located in closer longitudinal proximity to the second end surface 31 of the first plate-like portion 28 than it is to the first end surface 30 of the first plate-like portion 28. Because of their contiguous dispositions the first and second plate-like portions 28 and 29 may conveniently be fabricated from a single piece of material, such as metal, so that the plate-like portions 28 and 29 will be integral.

The uppermost surface 24 on the body portion 20 of the link element 10 is presented from the second plate-like portion 29. The vertically opposite side of the second plate-like portion 29 presents a contacting surface 34, the purpose for which will be hereinafter more fully described in conjunction with the explanation of the operation of the link element 10.

Figure 6:
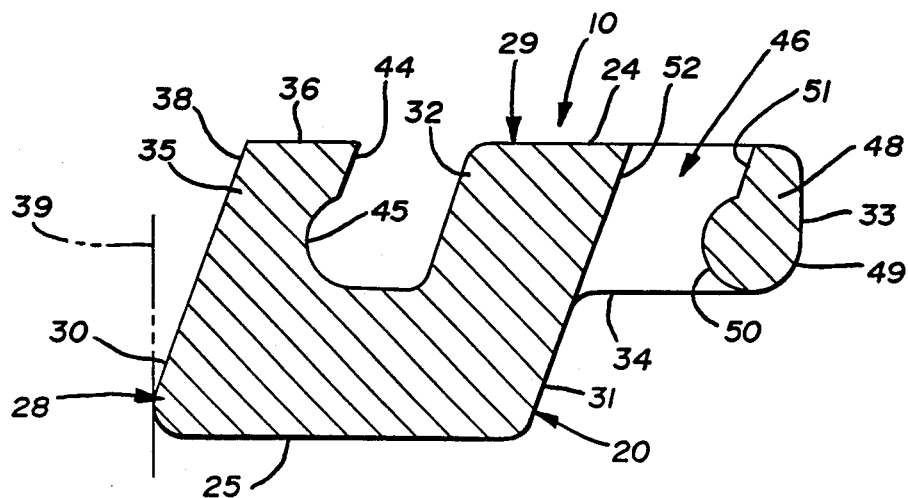
FIG. 6 is a cross section taken substantially along line 6—6 of FIG. 4.

A hook 35 extends upwardly from the first plate-like portion 28 and terminates in a table 36 which defines the vertically uppermost extent of the hook 35. As is best seen from FIG. 6, the table 36 is preferably disposed in coplanar relation with the uppermost surface 24 presented from the second plate-like portion 29. The hook 35 is also located in proximity to the first end surface 30 of the first plate-like portion 28. In fact, the first end surface 30 of the first plate-like portion 28 is disposed in coplanar relation with a driving surface 38 on the hook 35. As can best be seen in FIG. 6, the end surface 30 and the coplanar driving surface 38 are not vertically disposed; rather, those surfaces are inclined at approximately 20 degrees with respect to a vertical reference 39.

As best seen in FIGS. 1, 2 and 4, the hook 35 is approximately one third the width of the link element 10, and is preferably disposed medially with respect to the lateral dimension of the first plate-like portion 28. Accordingly, the hook 35 is itself laterally bounded by side surfaces 40 and 41 which may extend vertically upwardly from blocking surfaces 42 and 43, respectively. The blocking surfaces 42 and 43 are located laterally of the hook 35, one on each side thereof, and are presented from the vertically upwardly directed side of the first plate-like portion 28.

The hook 35 also presents a face 44 which opposes the first end surface 32 of the second plate-like portion 29 and which is also preferably inclined to lie parallel to the first end surface 30 on the first plate-like portion 28 as well as the driving surface 38 on the hook 35. In fact, the first end surface 32 of the second plate-like portion 29 is also preferably inclined relative to vertical and it too lies parallel to the surfaces 30, 38 and 44.

A concave, generally semi-cylindrical recess 45 extends laterally across the face 44 of hook 35 and is tangent to the level of the blocking surfaces 42 and 43 on the first plate-like portion 28. The recess 45, as will hereinafter become apparent, serves at least two important functions in the operation of the link element 10 when contained in a V-belt 11, as will be described in greater detail in the explanation as to the operation of the link elements 10 when contained in a V-belt.

An aperture 46 penetrates the second plate-like portion 29 to define a draw bar 48. One longitudinal side of the draw bar 48 presents a portion of the second end surface 33 on the second plate-like portion 29, and the other longitudinal side of the draw bar 48 presents a convex, generally semi-cylindrical protuberance 50 which extends longitudinally outwardly from vertically beneath a driving surface 51 on the drawbar 48. The driving surface 51 is inclined with respect to vertical, and it, too, preferably lies parallel to surfaces 31, 32, 38 and 44.

The protuberance 50 extends laterally along the draw bar 48 on the same side thereof as the aperture 46. The convex protuberance 50, like the concave recess 45, also serves at least two important functions in the operation of the link element 10 when contained in a V-belt 11. In fact, it is the cooperative interengagement of the convex protuberance 50 with the concave recess 45 which effects the two desired functions.

The semi-cylindrical surface which defines the convex protuberance 50 tangentially intersects the second end surface 33 of the second plate-like portion 29 to present a round 49, the purpose of which will hereinafter become apparent.

The aperture 46 is also longitudinally bounded by a driving surface 52 which opposes the protuberance 50 across the longitudinal span of the aperture 46. The driving surface 52 is disposed in coplanar relation with the second end surface 31 on the first plate-like portion 28, and the coplanar surfaces 31 and 52 are also preferably inclined relative to vertical. As such surfaces 31 and 52 also preferably lie parallel to the surfaces 30, 32, 38, 44 and 51.

The lateral dimension of the aperture 46 is just enough greater than the corresponding lateral dimension of the hook 35 that those dimensions will not interfere with the manipulation required to insert and withdraw the hook 35 with respect to the aperture 46. However, to permit only selective insertion, and withdrawal, of the hook 35 with respect to the aperture 46 it is required that the longitudinal dimensions of link element 10 be carefully selected. The various considerations which determine selection of the longitudinal dimensions of the link element 10 will be pointed out during the hereinafter explained operation of the link element 10 relative to its use in a V-belt 11.

OPERATION

Force Transmission

When a plurality of novel link elements 10 are successively joined as a V-belt 11 the beveled side walls 21 and 22 engage the flanges which diverge outwardly from the hub of the sheaves 12 and 14 in a manner well known to the art. A typical installation of a plurality of link elements 10 employed to form a V-belt 11 are schematically represented in FIG. 3. The novel link elements 10 are fully capable of effecting a force transmission under tensile or compressive loading. Historically, V-belts were distinctly tensile, or distinctly compressive, in nature. The construction of link elements 10 embodying the concepts of the present invention are, however, equally suited for the transmission of force under either loading condition.

In either event, when the V-belt 11 is transmitting a high torque load the link elements 10 forming the V-belt 11 are forced firmly into engagement with the flanges of the sheaves 12 and 14. That is, the sheaves 12 and 14 apply a high lateral load against the side walls 21 and 22 of the link elements 10. Link elements 10 embodying the concepts of the present invention are constructed such that the laterally loading so applied is resisted by the continuous columnar integrity at the longitudinal ends of the link elements 10 as well as at the medial portion thereof.

Reference to the drawings will quickly reveal that the first end surface 30 of the first plate-like portion 28 is uninterrupted along its lateral dimension; the draw bar 48 maintains an uninterrupted integrity to the second end surface 33 of the second plate-like portion 29; and, the medial section of the link element 10, which constitutes the longitudinal span of the first and second plate-like portions 28 and 29 which overlap, is also uninterrupted.

Accordingly, the lateral dimension of the aperture 46 will remain virtually unaltered under the application of even severely high lateral loading applied to the V-belt 11, thus precluding any tendency for a hook 35 to bind within an aperture 46 of successively conjoined link elements 10.

Figure 7:
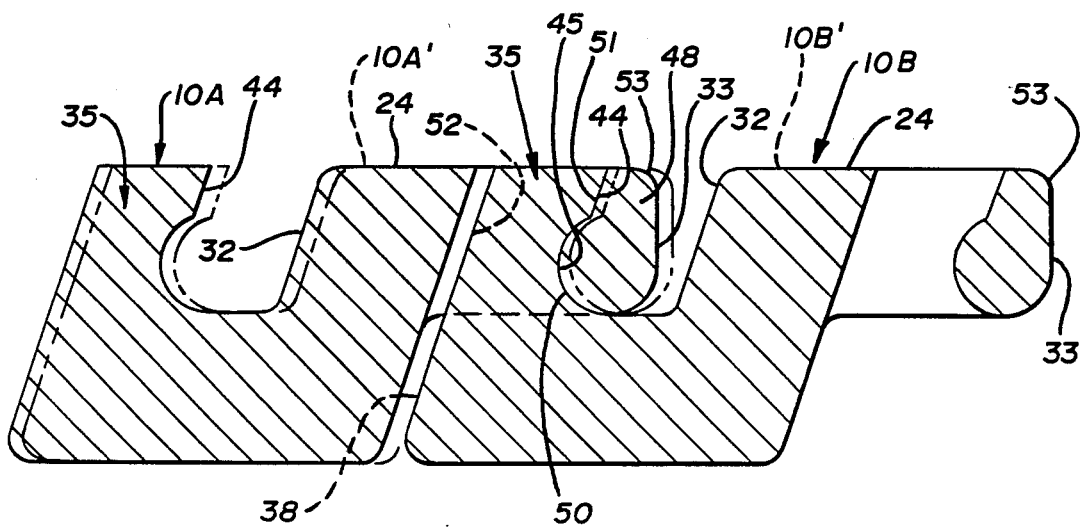
FIG. 7 is a cross sectional view, similar to FIG. 6, but depicting the operative interconnection between two successively conjoined link elements—the solid line depiction representing the operative interconnection under a load imparting a tensile stress to the link elements, and the phantom depiction representing the operative interconnection under a load imparting a compressive stress to the link elements; and, FIG. 8 is a cross sectional view, similar to FIG. 6, and depicting representative dispositions of successive link elements as they are manipulated through the sequential steps by which they are selectively joined, or separated.

Turning, first, to a consideration of the link elements 10 as employed in an environment where the transmission of force is to be effected by the application of tensile loading to the successive link elements forming the V-belt 11, one should refer to the solid line representations in FIG. 7. As is seen by reference to that aspect of FIG. 7, the engagement of the convex protuberance 50 with the recess 45 provides a rolling contact between the successive link elements 10 when they are in a V-belt 11 and operating under a tensile load. That is, when link element 10B is, in effect, "pulling" link element 10A the protuberance 50 on link element 10A is fully received within the recess 45 of link element 10B. In addition, when the link elements 10A and 10B, under tensile loading, are traversing a linear run, as in run 16A, the face 44 of the hook 35 on link element 10B is in engagement with the driving surface 51 on the draw bar 48 of link element 10A. These surfaces constitute the maximum contact between successive link elements when they are being operated under a tensile loading situation.

At this point it should be observed that the wall of the concave recess 45 tangentially merges with the blocking surfaces 42 and 43 on the first plate-like portion 28. As such, the force applied by the protuberance 50 against the hook 35 has the minimum possible moment arm available to apply a bending moment to the hook 35. Moreover, the lateral dimension of the hook 35 may be equal to approximately one third the lateral dimension of the link element 10 without overly extending the length of the draw bar 48 that is to engage the hook 35 on a successively conjoined link element 10. In addition, the longitudinal dimension of the hook 35, even at the location of its least dimension in that direction (i.e., between the driving surface 38 and the recess 45) can be designed to achieve a structural section compatible with the overall configuration of the hook 35, and its joinder to the first plate-like portion 28, such that the optimal resistance to bending stresses is provided.

The above described orientation of the recess 45 relative to the location of the blocking surfaces 42 and 43 also assures that the contacting surface 34 on the second plate-like portion 29 will engage the blocking surfaces 42 and 43 of a successively conjoined link element when the protuberance 50 is operatively received within a recess 45. Thus, not only the engagement of the protuberance 50 with the recess 45 but also the engagement of the contacting surface 34 with the blocking surfaces 42 and 43 will resist the twisting of one link element relative to a conjoined link element about a longitudinal axis. Hence, link elements constructed in accordance with the concepts of the present invention also provide optimal resistance to torsional stresses.

When the successive link elements 10A and 10B begin to traverse an arcuate path, as they will when the V-belt pass around a portion of one of the sheaves 12 or 14, the face 44 presented from the hook 35 on link element 10B will disengage from the driving surface 51 presented from the draw bar 48 on link element 10A, and only the rolling contact between the protuberance 50 and the recess 45 will be maintained. In fact, the rolling contact achieved by engagement of the protuberance 50 with the recess 45 is maintained as long as the successive link elements 10 are subjected to a tensile loading.

Were the parallel driving surfaces 38 and 52 oriented vertically, rather than being inclined with respect to a vertical frame of reference, as depicted, the successive link elements 10A and 10B would not be able to rotate, one with respect to another, about the engagement of the protuberance 50 on link element 10A with the recess 45 in the hook 35 of link element 10B. The selection of an angle of inclination in conjunction with the longitudinal span of the aperture 46, however, allows the link element 10A to rotate through a predetermined angle with respect to the link element 10B.

Specifically, link element 10A may rotate until the outside round 53 between the second end surface 33 on the second plate-like portion 29 and the uppermost surface 24, both on the link element 10A, engages the first end surface 32 on the second plate-like portion 29 of link element 10B. The maximum angle of rotation for the exemplary link elements depicted is represented by virtue of the solid line portion of FIG. 8. It should now be appreciated that the maximum angle of rotation between successive link elements 10, as heretofore described, also determines the minimum diameter of the sheave upon which link elements of a given dimension can be functionally operative.

Turning now to a consideration of the link elements 10 as employed in an environment where the transmission of force is to be effected by the application of compressive loading to the successive link elements forming the V-belt 11, one should refer to the phantom line representations in FIG. 7. As is seen by reference to that portion of FIG. 7, the convex protuberance 50 does not engage the recess 45. Rather, when link element 10A' is, in effect, "pushing" link element 10B' the driving surface 52 on link elements 10A' engages the opposing drive surface 38 on link element 10B'.

When the link elements 10A' and 10B' are traversing a linear run, as in run 16B, under compressive loading, the driving surface 52 on link element 10A' fully engages the driving surface 38 on link element 10B'. These surfaces constitute the maximum contact between successive link elements when they are being operated under a compressive loading situation.

When the successive link elements 10A' and 10B' begin to traverse an arcuate path, as they will when the V-belt pass around a portion of one of the sheaves 12 or 14, the driving surface 38, presented from the hook 35 as well as the second end surface on the first plate-like portion 28 of link element 10A' will begin to disengage from the driving surface 38 presented from the hook 35 as well as the first end surface 30 on the first plate-like portion 28 of plate-like portion 10B'. The driving surface 52 on link elements 10A' will however, remain in contact with the corner 55 which defines the intersection of the driving surface 38 with the table 36 on the hook 35 of the link element 10B'. Although the stresses will tend to concentrate by virtue of this loading arrangement, the configuration of the hook 35 is such that the aforesaid loading will not be deleterious to the link elements 10A' or 10B'.

It should be understood that the articulating rotation of the link element 10A' (or 10A) relative to the link element 10B' (or 10B) will be the same under compressive loading as it was under tensile loading. Hence, the range of articulation allowed between successive link elements 10A' and 10B' during their operative interengagement under compressive loading will also be controlled by physical contact of the outside round 53 on the link element 10A' with the first end surface 32 on the second plate-like portion 29 of link element 10B'. The maximum angle through which the exemplary link elements depicted can be articulated when subjected to compressive loading is also represented by virtue of the solid line portion of FIG. 8 and is the same irrespective of whether the link elements 10 are being operated to transmit forces under tensile or compressive loadings.

It should now also be apparent that irrespective of whether the link elements are being subjected to tensile or compressive loadings, the protuberance 50 will not be able to exit from the recess 45 inadvertently. When the successive link elements 10 are subjected to tensile loading, the protuberance 50 on link element 10A fully engages the recess 45 on link element 10B, and neither can, therefore, be translated vertically with respect to the other. Similarly, when the successive link elements are subjected to a compressive loading the protuberance 50 does not move longitudinally out of the recess 45 to an extent sufficient for the link elements to be translated vertically, one with respect to the other. Accordingly, the protuberance 50 and the recess 45 cooperate not only to provide a rolling contact between the successive link elements during the application of a tensile loading therebetween but also serve to preclude disengagement between the successive link elements 10 during the application of compressive loading therebetween.

Selective Interconnection of Successive Link Elements

Figure 8:
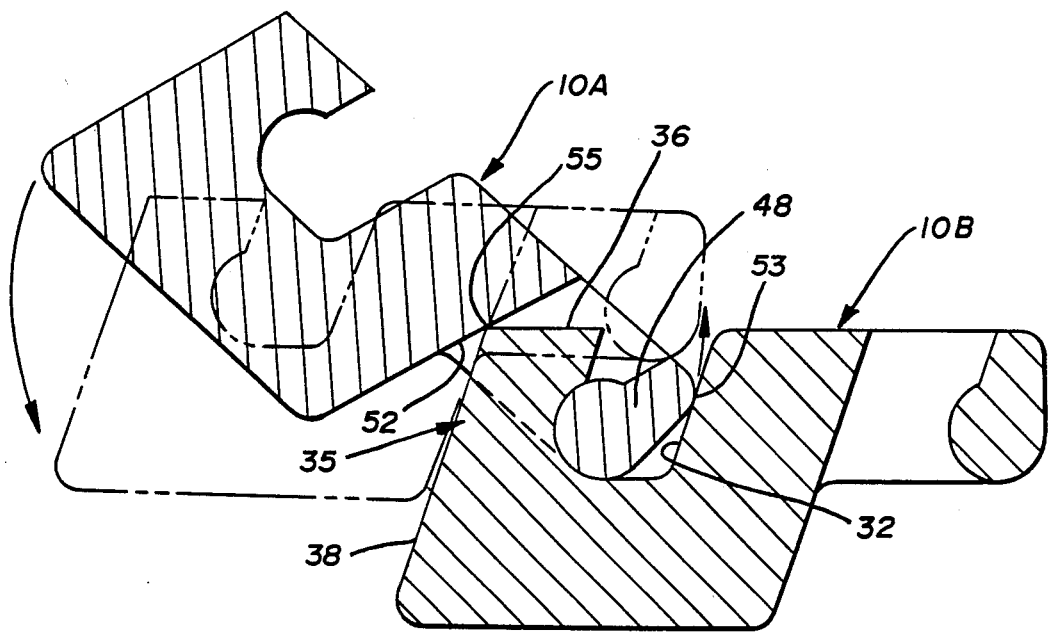

The sequential, manipulative steps by which selectively to join, or separate, successive link elements 10 embodying the concepts of the present invention are depicted in FIG. 8. The steps to join are reversed from those to separate so that an understanding of one procedure will clarify the other procedure.

To separate successive link elements 10 the link elements to be separated are first disposed, one relative to the other, as though they were transmitting forces under a tensile loading situation. That is, the successive link elements being separated are oriented in the solid line representation of FIG. 7. For consistency and convenience, therefore, the successive link elements being separated will be identified as link elements 10A and 10B. In that relative disposition of the link elements 10A and 10B, link element 10A must be articulated relative to link element 10B about the rolling contact between the protuberance 50 and the recess 45 in which the protuberance 50 is received. As such, the link element 10A will be articulated clockwise, as viewed in FIG. 8, relative to link element 10B so that the two link elements are disposed as depicted by the solid line representation in that same figure.

With the link elements thus disposed, link element 10A is then pivoted counterclockwise such that the outside round 53 on the second plate-like portion 29 thereof slides up the first end surface 32 on the second plate-like portion 29 of link elements 10B. The required pivoting action of link element 10A also allows the lower outside round 49 on link element 10A to slide along the blocking surfaces 42 and 43 on link element 10B. Careful selection of the vertical dimensions of the plate-like portions 28 and 29 of each link element 10, as well as the longitudinal dimensions of the link elements 10, in conjunction with the particular angle at which the drive surfaces 38 and 52 are inclined relative to vertical will allow the drive surface 52 to move, as required, along the corner 55 until the link element 10A is disposed in a position relative to the link element 10B as represented by the phantom line representation in FIG. 8. So disposed, the link element 10A can then be translated obliquely in a generally vertical direction to allow the protuberance 50 on link element 10A to slide past the face 44 of the hook 35 on link element 10B. This effects a complete separation of the successive link elements 10A and 10B. Should one wish to rejoin those link elements, one merely reverses the procedure heretofore described.

It should therefore, now be apparent that link elements embodying the concepts of the present invention can be joined in a successive series by selective manipulation to provide a V-belt that is equally suitable to transfer power under the application of a tensile load as it is under the application of a compressive load, said link elements providing optimal resistance to columnar, bending and torsional stresses while otherwise accomplishing the objects of the invention.

The embodiments of the invention in which an exclusive property or privilege is claimed are defined as follows:

1. A V-belt formed from a successive series of link elements, each said link element comprising: a body portion definable in relation to longitudinal, lateral and vertical axes; said body portion having laterally spaced, beveled side walls; said body portion having first and second plate-like portions; each said plate-like portion having longitudinally spaced first and second ends; said second plate-like portion vertically overlying said first plate-like portion and being longitudinally disposed with respect to said first plate-like portion such that the first end of said second plate-like portion is located in closer proximity to the second end of said first plate-like portion than to the first end of said first plate-like portion; hook means extending vertically upwardly from said first plate-like portion in proximity to the first end thereof; an aperture penetrating said second plate-like portion to define a draw bar at the second end of said second plate-like portion; said hook means on one link element being selectively insertable within the aperture of a successively adjacent link element to effect an operative interconnection therebetween.

2. A V-belt formed from a successive series of link elements, each said link element comprising: a body portion definable in relation to longitudinal, lateral and vertical axes; said body portion having laterally spaced, beveled side walls; said body portion having first and second plate-like portions; each said plate-like portion having longitudinally spaced first and second ends; said second plate-like portion being both longitudinally offset and vertically juxtaposed with respect to said first plate-like portion such that the first end of said second plate-like portion is disposed vertical proximity to the second end of said first plate-like portion; hook means extending vertically upwardly from said first plate-like portion in proximity to the first end thereof; a concave, generally semi-cylindrical recess extending laterally of said hook means and facing the first end of said second plate-like portion; an aperture penetrating said second plate-like portion to define a draw bar at the second end of said second plate-like portion; a convex, generally semi-cylindrical protuberance extending laterally of said draw bar and facing said aperture; said hook means on one link element being selectively insertable within the aperture of a successively adjacent link element with the convex protuberance being receivable within said concave recess to effect a rolling contact between the successive elements; the longitudinal spacing between said hook and the first end of said second plate-like portion on each link element being such that the engagement between said protuberance and said recess effects a selective interlock between successive link elements.

3. A V-belt formed from a successive series of link elements, each said link element comprising: a body portion definable in relation to longitudinal, lateral and vertical axes; said body portion having laterally spaced, beveled side walls; said body portion having first and second plate-like portions; each said plate-like portion having longitudinally spaced first and second end surfaces; said second plate-like portion vertically overlying said first plate-like portion and being longitudinally disposed with respect to said first plate-like portion such that the first end surface of said second plate-like portion is located in vertical proximity to the second end surface of said first plate-like portion; said first and second end surfaces on said first plate-like portion as well as said first end surface on said second plate-like portion being substantially parallel and being inclined at a selected angularity with respect to a vertical frame of reference; hook means extending vertically upwardly from said first plate-like portion in proximity to the first end surface thereof but medially the lateral span of said first plate-like portion and terminating in a table lying substantially coplanar with the vertically upper surface of said second plate-like portion; said hook means having a driving surface formed as a continuation of, and lying coplanar with, the first end surface of said first plate-like portion; said hook means having a face disposed in opposition to the first end of said second plate-like portion; a convex, generally semi-cylindrical rolling contact surface recessed into said face and extending laterally of said hook means; an aperture penetrating said second plate-like portion to define a draw bar at the second end of said second plate-like portion; an aperture driving surface defining the wall of said aperture opposed to said draw bar, said driving surface formed as a continuation of, and lying coplanar with, the second end surface of said first plate-like portion; a convex, generally semi-cylindrical, rolling contact surface protruding from said draw bar in opposition to said aperture driving surface; the hook means one one link element being selectively receivable in the aperture of a successive link element with the rolling contact surfaces of said hook means and said connecting bar being engageable to effect a tensile connection between said successive link elements; the span between said convexly protruding rolling surface and the aperture driving surface on each link element being selectively greater than the span between said concavely recessed rolling surface and the hook driving surface of said link elements; the span between said concavely recessed rolling surface and the intersection between the hook driving surface and the hook table of each link element being selectively less than the span between the convexly protruding rolling surface and the aperture driving surface of said link elements; the aforesaid span relationships assuring that engagement of said rolling contact surfaces effects a selective interlock between successive link elements.

* * * * *